(12) United States Patent
Pulkayath et al.

(10) Patent No.: US 9,600,307 B1
(45) Date of Patent: Mar. 21, 2017

(54) DYNAMIC POLICY BASED PLACEMENT OF VIRTUAL MACHINES WITHIN AND ACROSS MULTIPLE DATA CENTERS

(75) Inventors: Vinod K. Pulkayath, Marlborough, MA (US); Ashish A. Palekar, Franklin, MA (US)

(73) Assignee: EMC IP HOLDING COMPANY LLC

( * ) Notice: Subject to any disclaimer, the term of this patent is extended or adjusted under 35 U.S.C. 154(b) by 254 days.

(21) Appl. No.: 13/609,398

(22) Filed: Sep. 11, 2012

(51) Int. Cl.
 *G06F 9/46* (2006.01)
 *G06F 9/455* (2006.01)
 *G06F 9/50* (2006.01)

(52) U.S. Cl.
 CPC ...... *G06F 9/45533* (2013.01); *G06F 9/45558* (2013.01); *G06F 9/50* (2013.01)

(58) Field of Classification Search
 CPC ..... G06F 9/50; G06F 9/45558; G06F 9/45533
 See application file for complete search history.

(56) References Cited

U.S. PATENT DOCUMENTS

| | | | |
|---|---|---|---|
| 8,027,354 B1* | 9/2011 | Portolani | H04L 49/70 370/395.2 |
| 8,489,744 B2* | 7/2013 | Elyashev et al. | 709/226 |
| 2010/0115509 A1* | 5/2010 | Kern et al. | 718/1 |
| 2011/0191477 A1* | 8/2011 | Zhang | G06F 15/173 709/226 |
| 2012/0324073 A1* | 12/2012 | Dow et al. | 709/223 |
| 2016/0212198 A1* | 7/2016 | Krishnasamy | H04L 67/1097 |

* cited by examiner

*Primary Examiner* — Camquy Truong
(74) *Attorney, Agent, or Firm* — Anderson Gorecki LLP

(57) ABSTRACT

New and existing virtual machines are dynamically located. Dynamic location can be prompted based on performance degradation, load balancing and other policies. Potential locations include other hosts within a data center and other data centers.

24 Claims, 7 Drawing Sheets

DYNAMIC POLICY BASED PLACEMENT OF VIRTUAL MACHINES WITHIN AND ACROSS MULTIPLE DATA CENTERS

CROSS-REFERENCE TO RELATED APPLICATIONS

NA

BACKGROUND OF THE INVENTION

The invention is generally related to data centers, and more particularly to operation of virtual servers on host devices to provide services supported by data storage subsystems.

Enterprises utilize data centers to provide various services over a network. A data center typically includes groups of host devices and data storage subsystems. Each data storage subsystem includes at least one enterprise storage array having multiple physical storage devices. Technologies such as RAID and remote site mirroring may be used to help avoid data loss. Further, different types of storage devices and tiered levels of storage may be utilized in order to help provide both high performance and high capacity at a practical cost. Client applications and devices communicate with the host devices, and the host devices utilize the storage array in order to provide services to the client applications and devices.

The host devices are typically types of physical servers. Each host device may be dedicated to running a particular application. However it is becoming more common for host devices to implement multiple virtualized servers (a.k.a. virtual machines or VMs) which run applications to provide services to the clients. In particular, the virtual machines on the host may run instances of the same applications or instances of different applications. Having one physical server running multiple virtual machines helps to improve efficiency and reduce total cost of ownership. The virtual machines may be run from a cluster of hosts in order to enhance availability. In response to the failure of a host in the cluster, the virtual machines associated with the failed host can failover (restart) on another host in the cluster.

SUMMARY OF THE INVENTION

In accordance with an aspect, a computer program stored on a non-transitory computer readable medium comprises: logic which monitors data center operation; logic which selects a host, in response to an indication that a virtual machine needs to be located, based on the monitored operations; and logic which instantiates or relocates the virtual machine to the selected host.

In accordance with another aspect, an apparatus comprises: a host device associated with a data center, the host device including non-transitory memory and a processor which run a computer program including: logic which monitors data center operation; logic which selects a host, in response to an indication that a virtual machine needs to be located, based on the monitored operations; and logic which instantiates or relocates the virtual machine to the selected host.

In accordance with an aspect a method comprises: monitoring data center operation; selecting a host device, in response to an indication that a virtual machine needs to be located, based on the monitored operations; and instantiating or relocating the virtual machine to the selected host.

An advantage associated with aspects is that some failover situations can be avoided. In particular, failover situations that are preceded by other indicators such as performance degradation can be recognized and virtual machines can be moved in advance of failure of the host. Dynamically locating virtual machines can also enhance performance via load balancing. For example, virtual machines can be moved in response to changing load conditions during normal operations to satisfy spikes in demand. Further, aspects can be applied to converged infrastructure elements such as 'data-center-in-a-rack' systems with integrated compute, network and storage functions. Moreover, these advantages can be scaled beyond a single data center and applied to a group of data centers or a group of converged infrastructure elements such as the Vblock platform.

Other features and advantages will become apparent in view of the detailed description and figures.

DETAILED DESCRIPTION

Certain aspects of the invention including but not limited to steps shown in flow diagrams may be implemented at least in-part with a computer program stored on non-transitory memory. The computer program is utilized by a physical processor device and possibly interfaces, transmitters, receivers and other hardware components in order to achieve the described functionality. The computer program may be distributed among multiple devices or operate on a single device, such as a host.

Figure 1:
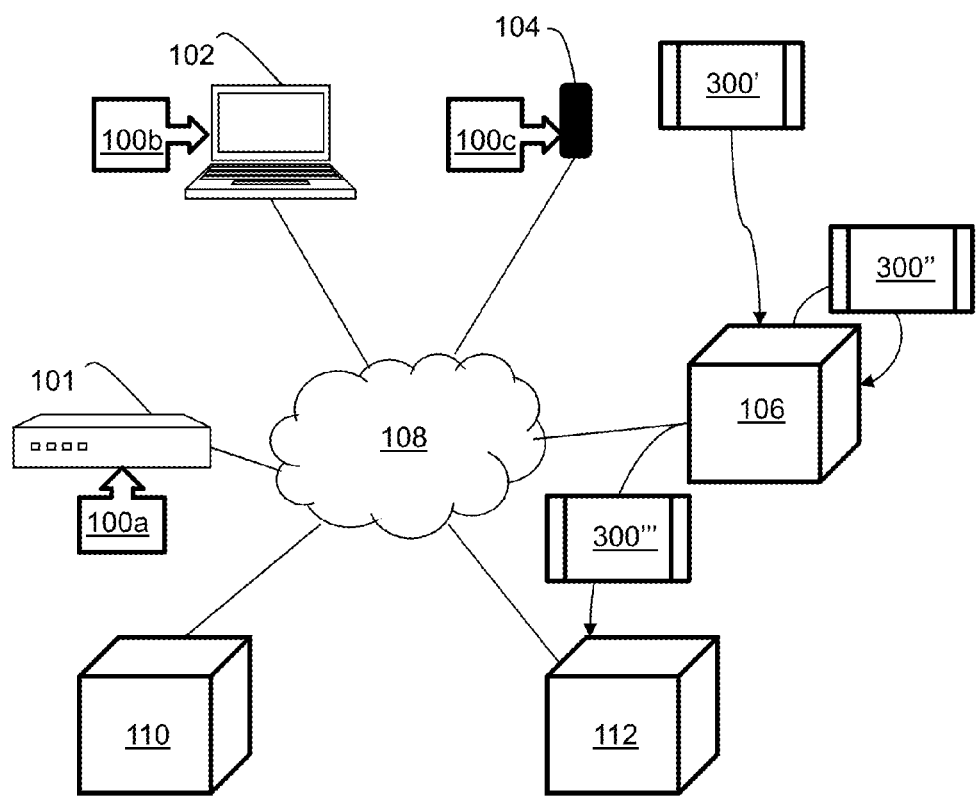
FIG. 1 illustrates a network of data centers and client devices.

FIG. 1 illustrates a simplified network environment in which client applications 100a, 100b, 100c running on any of various devices such as, without limitation, a server 101 or a user terminal such as a personal computer 102 or mobile phone 104, utilizes services provided by a data center 106 via a network 108. Additional data centers 110, 112 which may be located at different geographical locations may also exist and be capable of providing services to the client application.

Figure 2:
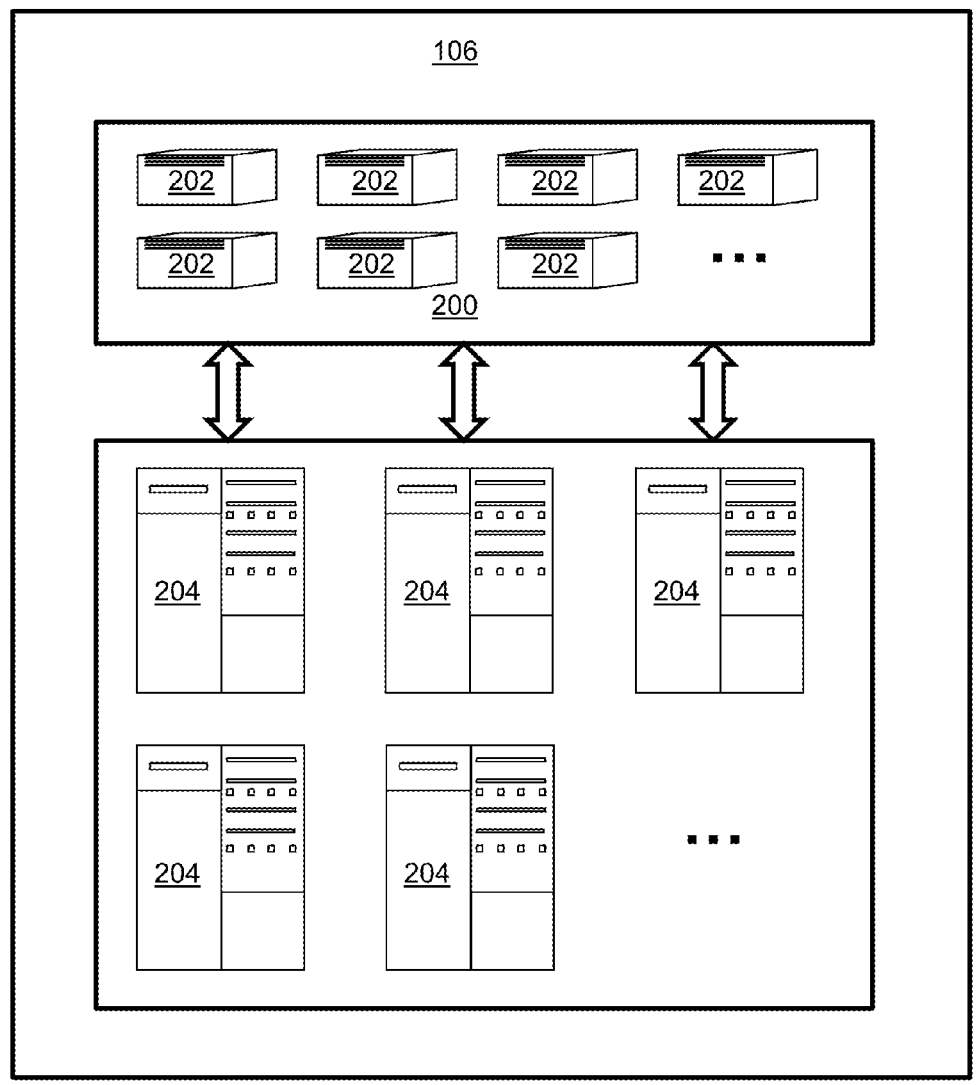
FIG. 2 illustrates a data center in greater detail.

Referring to FIG. 2, a data center such as data center 106 includes at least one cluster 200 of physical server devices 202 (hosts) and at least one data storage subsystem 204. The hosts and data storage subsystems are typically in communication via high bandwidth links. The data storage subsystem includes various physical storage devices which may be configured and managed in any of a wide variety of possibilities in order to provide a desired capacity, performance, reliability and level of data protection.

Figure 3:
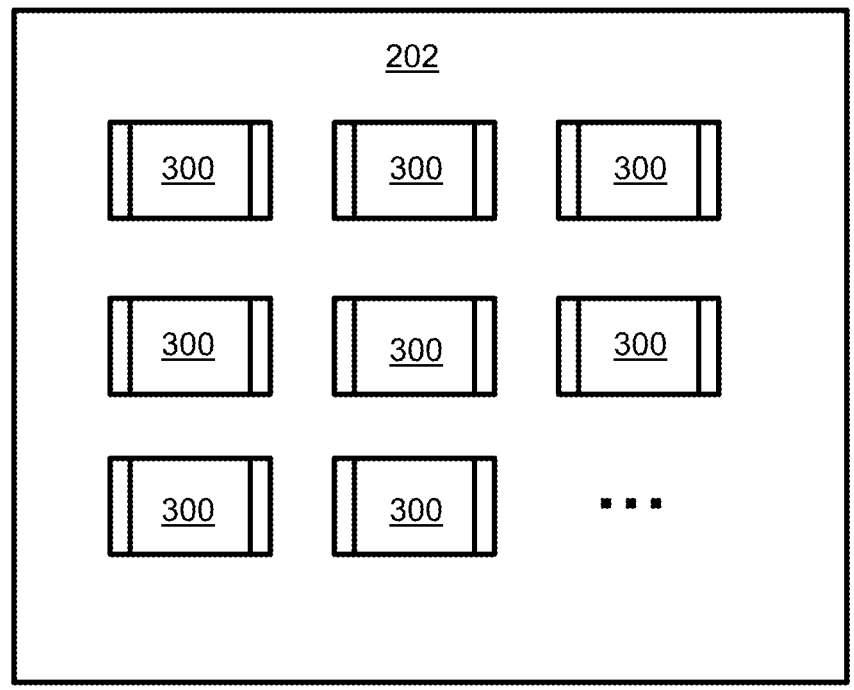
FIG. 3 illustrates a host device in greater detail.

Referring to FIG. 3, each host device 202 can run a plurality of virtual machines 300. Each virtual machine runs an application which provides services to the client applications. In particular, the virtual machines on the host may run instances of the same applications or instances of different applications. A wide variety of applications may be run by the virtual machines. For example, and without limitation, it is known to use the virtual machines as databases, application servers, file servers, and block servers. In a simple contextual example the client application can send an IO request to the application running on the virtual machine with which it is associated and the virtual machine performs corresponding Read or Write operations by communicating with the storage array. Each virtual machine may simultaneously provide services to multiple client applications. Furthermore, the requirements of client applications may change over time so the load on the virtual machine tends to change over time. It follows that the load on the host, cluster, storage array and data center also change over time. Further, virtual machines do not typically exist indefinitely, but rather are instantiated and inactivated in response to need or other factors.

Figure 4:
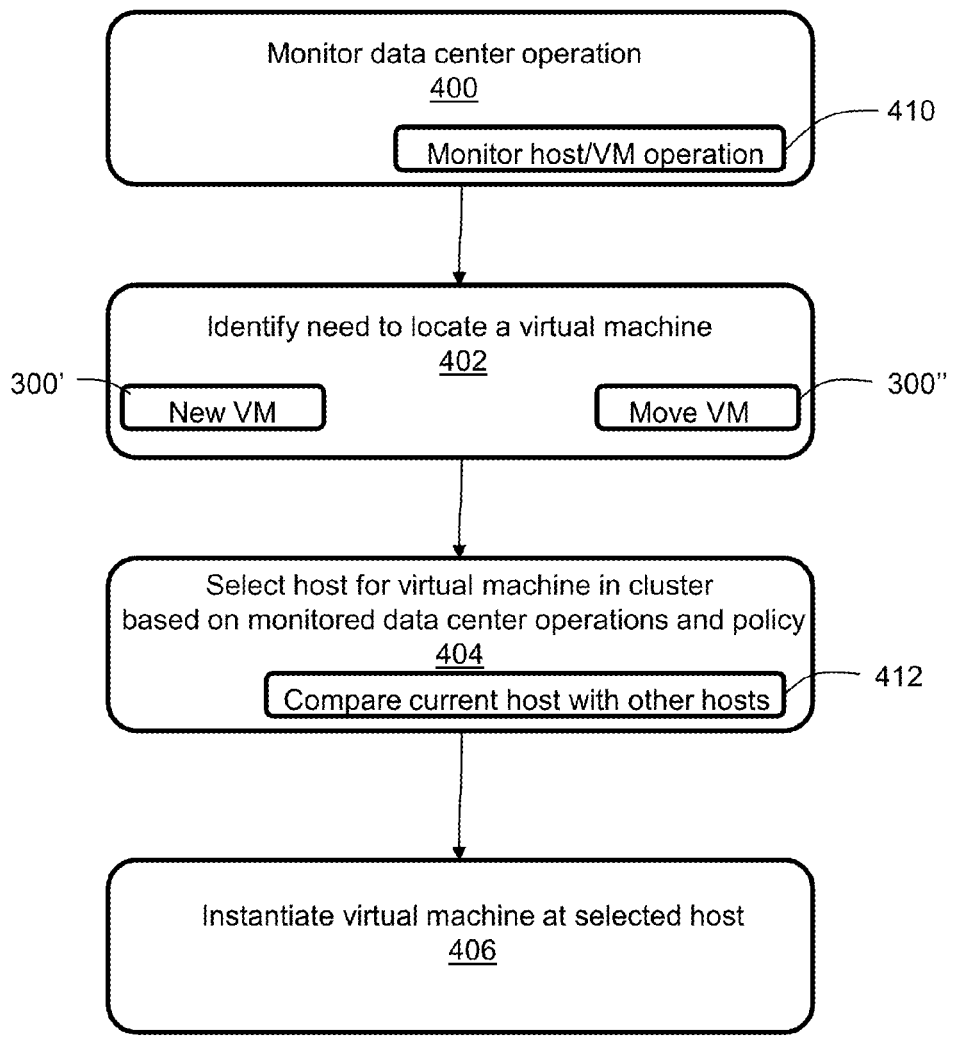
FIG. 4 illustrates dynamic placement of virtual machines within a data center.

Referring to FIGS. 1 and 4, logic is provided to dynamically locate a virtual machine 300' within the data center 106. Various known tools can be used to monitor data center operation in step 400. Metrics which may be monitored include but are not limited to the number of virtual machines instantiated on each host, CPU usage, bandwidth usage, and connectivity/path failure with a corresponding storage array. Once the need to locate a virtual machine is identified in step 402, e.g., the need to instantiate a new virtual machine 300', a host for the virtual machine is selected based on the monitored metrics in step 404. For example, the host with the least number of virtual machines, CPU usage or bandwidth usage might be selected. It is also possible that any host having a number of virtual machines, CPU usage or bandwidth usage that does not exceed a particular threshold might be selected. Any of various policies for selecting the host could be utilized. The virtual machine is then instantiated at the selected host in step 406.

In accordance with one aspect the step of identifying the need to locate a virtual machine (step 402) includes identifying a need to relocate an existing virtual machine 300" to a different host. In this case the step 400 of monitoring data center operation includes monitoring operation of individual virtual machines or hosts in sub-step 410. The performance of different applications will be indicated by different metrics. Consequently, the performance of the corresponding virtual machines and hosts may be indicated by different metrics. For example, and without limitation, the performance of a host or virtual machine may be measured on the basis of time to respond to requests from a client application. Whatever metrics are utilized, performance of a host or virtual machine that falls below a predefined policy standard is an indication that relocation of the virtual machine should be considered. In this case step 404 includes comparing performance of the current host with performance of other hosts in the cluster at sub-step 412. It will be appreciated that moving a virtual machine away from a failing host may be less disruptive than moving the virtual machine in response to failure of its host.

In accordance with one aspect the policy for identifying a need to locate a virtual machine includes load balancing. When selecting a host on which to instantiate a new virtual machine a policy can account for the number of virtual machines running on each host. In a simple contextual example the host having the lowest number of virtual machines is selected. Furthermore, virtual machines can be moved in order to maintain load balancing. For example, and without limitation, virtual machines may be moved such that the number of virtual machines running on hosts in the cluster is at least somewhat balanced. It will be appreciated that movement of virtual machines based on loading help respond to imbalances caused by inactivation of virtual machines.

Figure 5:
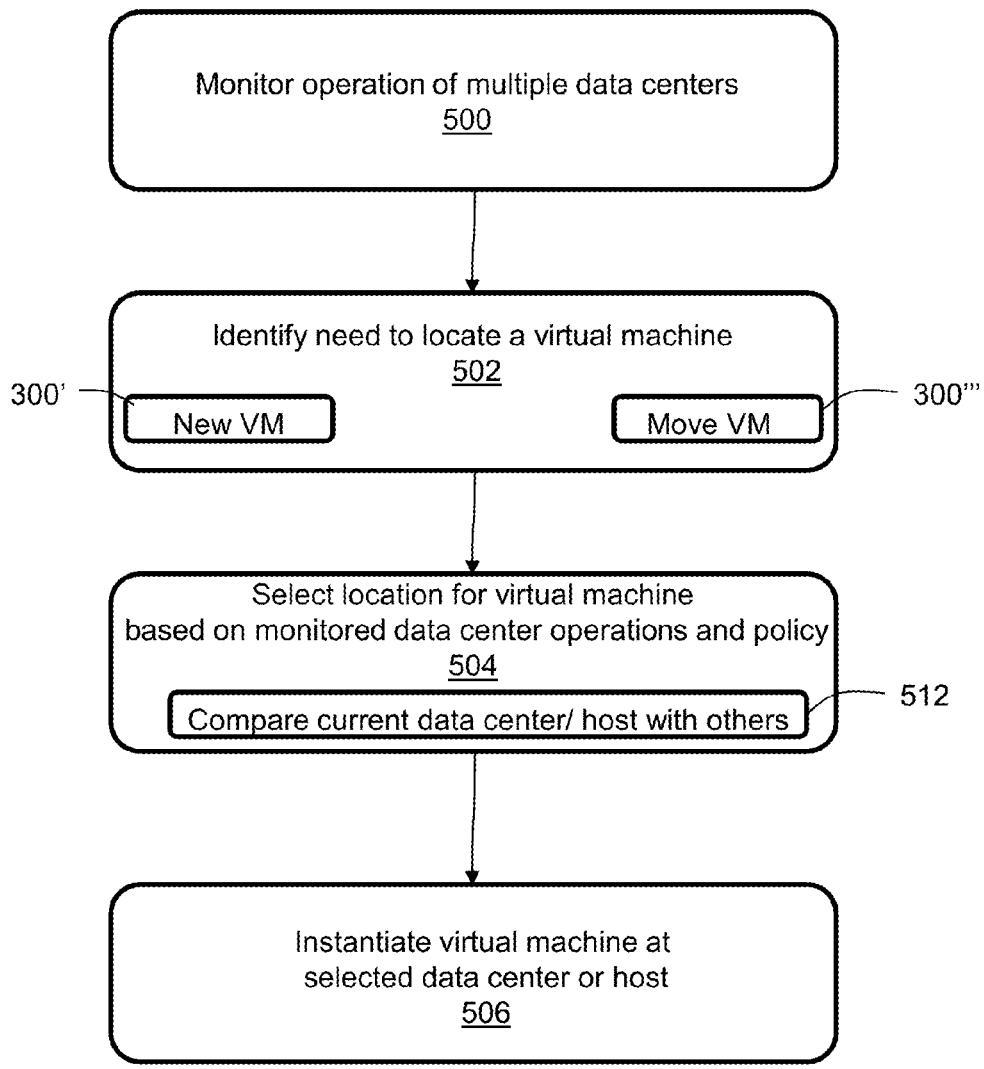
FIG. 5 illustrates dynamic placement of virtual machines within a group of data centers.

Referring to FIGS. 1 and 5, dynamic placement of virtual machines can include selection of a location at any of various data centers. Known tools can be used to monitor data center operation in step 500. Metrics which may be monitored include but are not limited to those previously mentioned. Once the need to locate a virtual machine is identified in step 502, e.g., the need to insatiate a new virtual machine 300', a data center or host for the virtual machine is selected based on the monitored metrics in step 504. In particular, the location selection may be performed at the data center or host level. If selection is at the host level then hosts at other data centers are considered, i.e., selection is not necessarily limited to a particular cluster. Any of a wide variety of policies might be applied for selection. For example, the data center or host with the least number of virtual machines, CPU usage or bandwidth usage might be selected. It is also possible that any data center or host having a number of virtual machines, CPU usage or bandwidth usage that does not exceed a particular threshold might be selected. Any of various policies for selecting the data center or host could be utilized. The virtual machine is then instantiated at step 506. If a specific host was selected at step 504 then the virtual machine is instantiated on the selected host. If a data center was selected rather than a specific host then the procedure described with respect to FIG. 4 may be utilized to select a specific host within the selected data center.

In accordance with one aspect the step of identifying the need to locate a virtual machine (step 502) includes identifying a need to move an existing virtual machine 300''' to a different data center or host. The previously mentioned policy metrics may be utilized, without limitation. Whatever policy metrics are utilized, performance of a data center, host or virtual machine that falls below a predefined policy standard is an indication that relocation of the virtual machine should be considered. In this case step 504 includes comparing performance of the current data center or host with performance of other data centers or hosts in sub-step 512.

In accordance with one aspect the policy for identifying a need to locate a virtual machine includes data center load balancing. When selecting a data center or host on which to instantiate a new virtual machine a policy can account for the number of virtual machines running on each data center. In a simple contextual example the data center having the lowest number of virtual machines is selected. Furthermore, virtual machines can be moved in order to maintain load balancing. For example, and without limitation, virtual machines may be moved such that the number of virtual machines running on different data centers is at least somewhat balanced.

Another use-case for mobility of virtual machines is availability. If a particular host loses access to storage paths where by the availability of data/data paths to the host is compromised, this same technique can be used to non-disruptively migrate virtual machines from one server to another. As in other cases, these same protocols and techniques are applicable to converged infrastructure platforms—a specific example of which is the Vblock platform.

Figure 6:
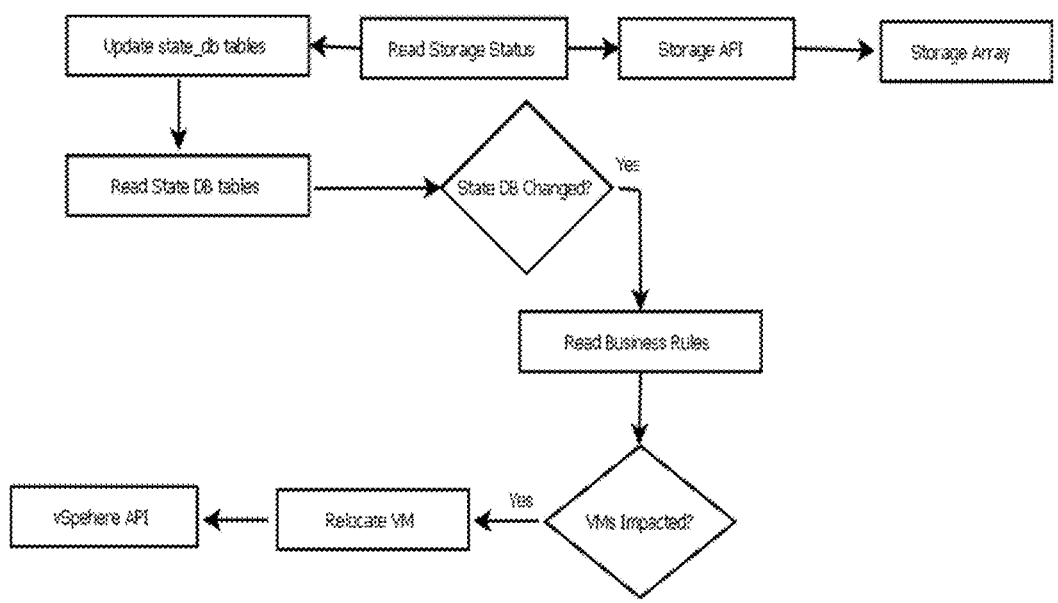
FIGS. 6 and 7 illustrate dynamic location of virtual machines in greater detail.
Figure 7:
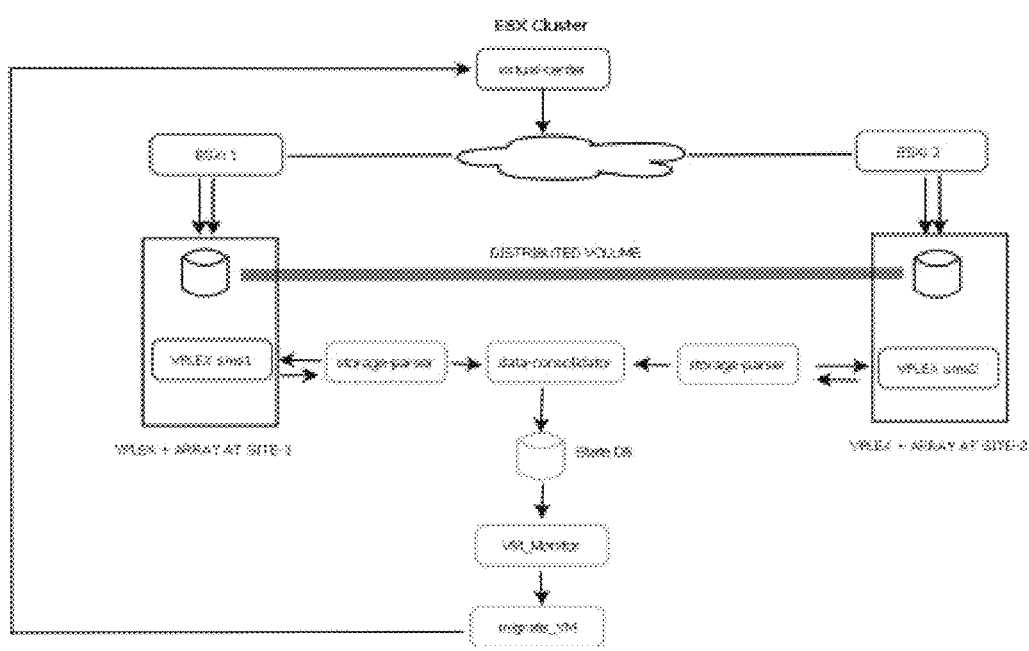

FIGS. 6 and 7 illustrate dynamic location of virtual machines in greater detail. The storage status is parsed and supplied to the state DB (Database) to be reviewed by the routines which compares it with the business rules. The business rules include; which site is preferred, what Virtual Machines are monitored, what storage volumes are monitored, which physical hosts are monitored, what users are close to which data center, which geographical area is experiencing a spike in demand for a specific service etc. On detecting a change in the storage array, the state DB will reflect the same change which is used by the programs to relocate VMs to the appropriate sites. The storage health at each site is obtained by the storage-parser process and posted to a state database. The database include monitored VM names, their datastore locations, the host initiator status and the preferred site settings for the distributed volume. The state database is read by the VM_monitor process and triggers a vMotion request using the migrate_VM component of the POC.

While the invention is described through the above examples, it will be understood by those of ordinary skill in the art that a wide variety of modifications to and variations of the illustrated embodiments may be made without departing from the inventive concepts herein disclosed. Moreover, while the embodiments are described in connection with various illustrative structures, one skilled in the art will recognize that the system may be embodied using a wide variety of specific structures. Accordingly, the invention should not be viewed as limited except by the scope and spirit of the appended claims.

What is claimed is:

1. A non-transitory computer readable medium comprising:
   logic which monitors performance of a first data center;
   logic which monitors performance of a second data center;
   logic which monitors performance of individual hosts of a first cluster of hosts in the first data center;
   logic which monitors performance of individual hosts of a second cluster of hosts in the second data center;
   logic which generates an indication that a virtual machine needs to be located;
   logic, responsive to the indication, which selects one of the first and second data centers based on monitored performance of the first data center and monitored performance of the second data center;
   logic which selects a host in the selected data center based on the monitored performance of individual hosts in the selected data center; and
   logic which instantiates or relocates the virtual machine to the selected host.

2. The computer readable medium of claim 1 wherein the indication is based on monitored performance of the first and second data centers relative to a predefined standard.

3. The computer readable medium of claim 1 wherein the host selection logic selects the host based on monitored host performance relative to a threshold.

4. The computer readable medium of claim 1 wherein the data center selection logic performs selection based on monitored data center performance aspects comprising at least one of: number of virtual machines instantiated, CPU usage, bandwidth usage, and connectivity/path failure with a corresponding storage array.

5. The computer readable medium of claim 1 wherein the host selection logic performs selection based on monitored host performance aspects comprising at least one of: number of virtual machines instantiated on each host, CPU usage, bandwidth usage, and connectivity/path failure with a corresponding storage array.

6. The computer readable medium of claim 1 wherein the indication that the virtual machine needs to be located comprises an indication that the virtual machine be moved from a first host to a second host.

7. The computer readable medium of claim 6 comprising logic which indicates that the virtual machine be moved based on performance degradation of the first host.

8. The computer readable medium of claim 6 comprising logic which indicates that the virtual machine be moved to more evenly balance host loading.

9. An apparatus comprising:
   a device associated with a first data center, the device including non-transitory memory and a processor which run a computer program including:
   logic which monitors performance of the first data center;
   logic which monitors performance of a second data center;
   logic which monitors performance of individual hosts of a first cluster of hosts in the first data center;
   logic which monitors performance of individual hosts of a second cluster of hosts in the second data center;
   logic which generates an indication that a virtual machine needs to be located;
   logic, responsive to the indication, which selects one of the first and second data centers based on monitored performance of the first data center and monitored performance of the second data center;
   logic which selects a host in the selected data center based on the monitored performance of individual hosts in the selected data center; and
   logic which instantiates or relocates the virtual machine to the selected host.

10. The apparatus of claim 9 wherein the indication is based on monitored performance of the first and second data centers relative to a predefined standard.

11. The apparatus of claim 9 wherein the host selection logic selects the host based on monitored host performance relative to a threshold.

12. The apparatus of claim 9 wherein the data center selection logic performs selection based on monitored data center performance aspects comprising at least one of: number of virtual machines instantiated, CPU usage, bandwidth usage, and connectivity/path failure with a corresponding storage array.

13. The apparatus of claim 9 wherein the host selection logic performs selection based on monitored host performance aspects comprising at least one of: number of virtual machines instantiated on each host, CPU usage, bandwidth usage, and connectivity/path failure with a corresponding storage array.

14. The apparatus of claim 9 wherein the indication that the virtual machine needs to be located comprises an indication that the virtual machine be moved from a first host to a second host.

15. The apparatus of claim 14 comprising logic which indicates that the virtual machine be moved based on performance degradation of the first host.

16. The apparatus of claim 14 comprising logic which indicates that the virtual machine be moved to more evenly balance host loading.

17. A method comprising:
   monitoring performance of a first data center;
   monitoring performance of a second data center;
   monitoring performance of individual hosts of a first cluster of hosts in the first data center;
   monitoring performance of individual hosts of a second cluster of hosts in the second data center;
   generating an indication that a virtual machine needs to be located;

responsive to the indication, selecting one of the first and second data centers based on monitored performance of the first data center and monitored performance of the second data center;

selecting a host device in the selected data center based on the monitored performance of individual hosts in the selected data center; and instantiating or relocating the virtual machine to the selected host.

18. The method of claim 17 comprising generating the indication based on monitored performance of the first and second data centers relative to a predefined standard.

19. The method of claim 17 including selecting the host based on monitored host performance relative to a threshold.

20. The method of claim 17 including selecting the data center based on monitored data center performance aspects comprising at least one of: number of virtual machines instantiated, CPU usage, bandwidth usage, and connectivity/path failure with a corresponding storage array.

21. The method of claim 17 comprising selecting the host based on monitored host performance aspects comprising: number of virtual machines instantiated on each host, CPU usage, bandwidth usage, and connectivity/path failure with a corresponding storage array, network conditions relative to application requirements.

22. The method of claim 17 comprising responding to the indication by moving the virtual machine from a first host to a second host.

23. The method of claim 22 comprising generating the indication based on performance degradation of the first host.

24. The method of claim 22 comprising generating the indication to more evenly balance host loading.

* * * * *